(Model.)
J. J. HOOKER.
MIRROR FOR OBTAINING TRUE OR POSITIVE REFLECTIONS.
No. 370,623. Patented Sept. 27, 1887.
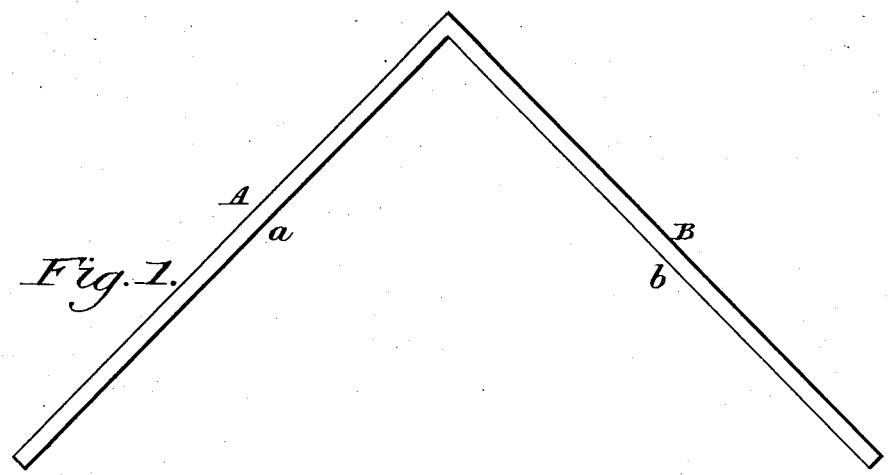
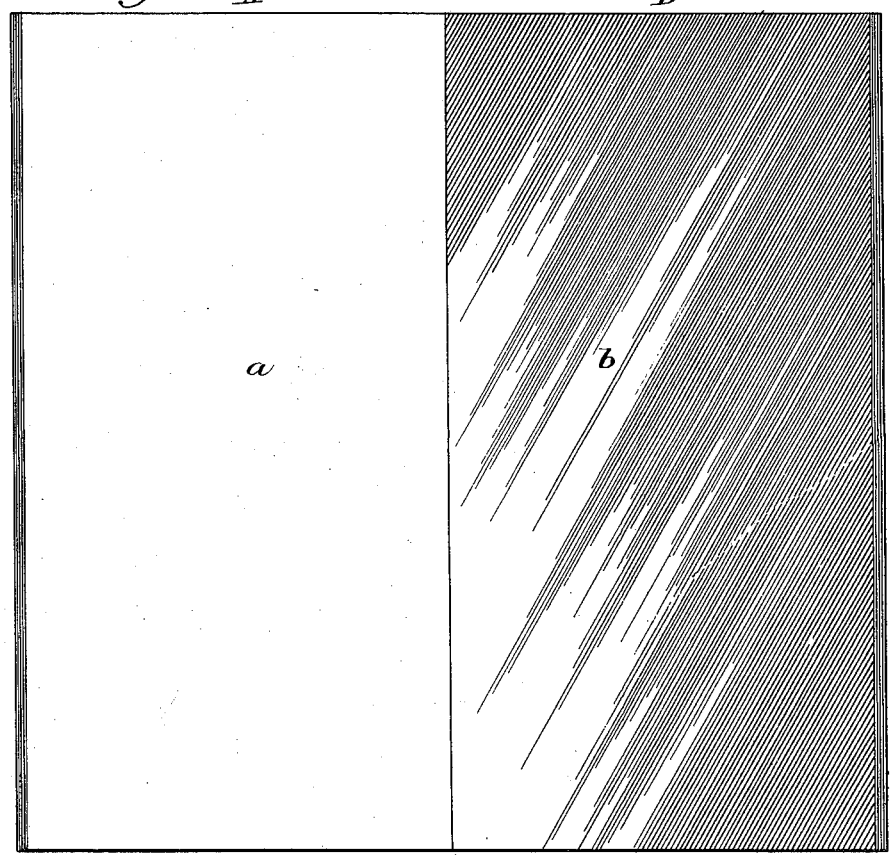
Witnesses:
William D. Conner.
David S. Williams.
Inventor:
John J. Hooker
by his Attorneys
Howson and Sons

UNITED STATES PATENT OFFICE.

JOHN JOSEPH HOOKER, OF TIDESWELL, COUNTY OF DERBY, ENGLAND.

MIRROR FOR OBTAINING TRUE OR POSITIVE REFLECTIONS.

SPECIFICATION forming part of Letters Patent No. 370,623, dated September 27, 1887.

Application filed August 25, 1886. Serial No. 211,808. (Model.) Patented in England March 12, 1886, No. 3,517.

*To all whom it may concern:*

Be it known that I, JOHN JOSEPH HOOKER, Catholic priest, a subject of the Queen of Great Britain and Ireland, residing at Tideswell, in the county of Derby, England, have invented certain new and useful Mirrors for Obtaining True or Positive Reflections, (for which I have made application for patent in Great Britain, No. 3,517, dated March 12, 1886,) of which the following is a specification.

My invention relates to mirrors constructed to give to persons looking into them true, or what may be termed "positive," reflections of themselves and of objects placed within their field or scope of reflection, and refers to the form of mirror whereby such effects are obtained, and not to the material of which mirrors may be constructed. In mirrors at present in use the reflection of an object is obtained from a single reflecting-surface, which for all practical purposes is a level or flat surface. Such mirrors, instead of giving what I term a "positive" reflection, give what may be termed a "negative" reflection. For instance, a watch would be reflected with the position of the figures and motion of the hands reversed, printed matter would be reversed by negative reflection back to the fac-simile of the type from which it was printed, and similarly the features, limbs, or movements of the human body are reversed by reflection from left to right and right to left.

The object of my invention is to produce mirrors of a kind suitable for ordinary use or enjoyment which will give to persons looking into them true or positive reflections of themselves and of every object within their field or scope—that is, persons would see themselves reflected exactly as they appear to others, a watch would be reflected with the position of its figures and the motion of its hands not reversed, and printed matter would appear in the mirror as on the paper, and similarly the features or limbs and movements of a human person would appear in the mirror exactly as they appear in reality—that is, the right arm of the real figure would appear as the right arm in the reflected figure, and so forth.

The accompanying drawings illustrate a mode of constructing a mirror according to my invention.

Figure 1 represents a top view, and Fig. 2 a front elevation.

I provide two flat reflecting-surfaces, A B, meeting at accurate right angles, or at any angle which is an exact equal division of a right angle—such as one-half, one-fourth, or one-eighth of a right angle—which may, if desired, for convenience of construction, be made up of two separate flat reflecting-surfaces fitted to each other, so as to form two planes meeting so closely as to touch each other, without any frame-work intervening, at accurate right angles or equal divisions of a right angle, as above mentioned, or, if desired, the two planes meeting at the required angle may be parts or wings of the same reflecting-plate, the object being to obtain two reflecting-surfaces converging and meeting at accurate right angles or equal divisions of a right angle, as above mentioned, the reflection being obtained from the inner or converging surfaces, *a b*. These two surfaces form the mirror, which gives within one or more of the reflected angles the true or positive reflection of any object within its field or scope, as already described. These positive mirrors necessarily contain two or more negative mirrors, and the negative or the positive reflection may be obtained, as desired, by either changing the position of the mirror or by changing the position of the person or object placed before it.

These mirrors may be used for all purposes for which the ordinary looking-glass is used. They may also be placed in shop-windows or other places for exhibiting articles, the appearance of each object placed within the range of reflection being multiplied by four or more, while the show-space—supposing the angle to be the accurate right angle—is increased to the square of the frontage, thereby producing very effective results.

I claim—

The herein-described compound positive reflection mirror, consisting of two converging reflecting-surfaces meeting closely at the intersection of their planes and rigidly connected at an exact right angle to each other, or at an angle which is an exact equal division of a right angle—such as one-half or one-fourth or one-eighth of a right angle—substantially as herein set forth.

In testimony whereof I have signed my name to this specification in the presence of two subscribing witnesses.

JOHN JOSEPH HOOKER.

Witnesses:
PHILIP HEATON FLINT,
MICHAEL HIGGINS,
*Both of Tideswell, Stockport.*